United States Patent Office 2,790,172
Patented Apr. 23, 1957

2,790,172

HETEROCYCLIC FUSED RING PHENOLS

Bernard Rudner, Baltimore, Md., assignor to General Aniline & Film Corporation, New York, N. Y., a corporation of Delaware No Drawing. Application September 8, 1955,
Serial No. 533,241

17 Claims. (Cl. 260—305)

This invention relates to novel condensation products and to their methods of manufacture.

The novel products of this invention may be described as condensed and ring-closed products of a 2-aminothiazole with a para-quinone compound in which at least one position ortho to a carbonyl group is unsubstituted. In a more specific manner, these products may be defined in terms of the following formula:

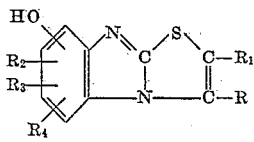

wherein R, $R_1$, $R_2$, $R_3$ and $R_4$ are selected from the group consisting of H, aliphatic and aromatic radicals, and when R and $R_1$ are taken together, and when $R_2$ and $R_3$ are taken together, the atoms necessary to form a cycle.

The products of the instant invention may be prepared in one step by reacting a 2-aminothiazole with a para-quinone compound in which at least one position ortho to a carbonyl group is unsubstituted in the presence of a ring-closing acidic condensing agent. This reaction may more specifically be described by the following equation:

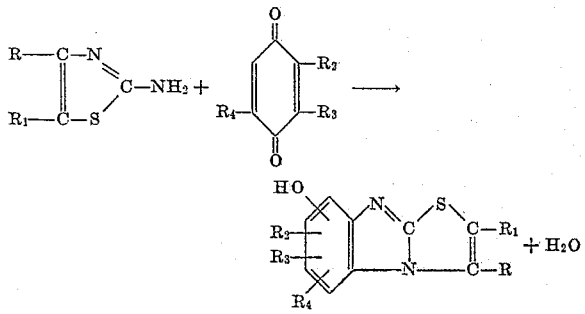

wherein R, $R_1$, $R_2$, $R_3$, and $R_4$ have the values given above.

By a somewhat similar procedure, the intermediate 1-1 addition product of a 2-aminothiazole with a para-quinone compound in which at least one position ortho to a carbonyl group is unsubstituted, as described and claimed in my copending application Serial No. 533,240, filed on even date herewith, having the formula

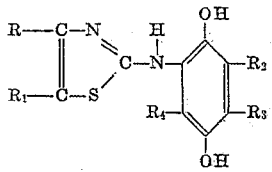

wherein R, $R_1$, $R_2$, $R_3$ and $R_4$ have the values given above, may be subjected to a ring-closure in the presence of a ring-closing acidic condensing agent to produce the desired products.

The simultaneous condensation and ring-closing reaction described above is preferably carried out at elevated temperatures of from about 80 to 110° C., although temperatures of from 50 to 120° C. may be employed. The reaction is, in some cases, exothermic in nature and accordingly, after the reaction has begun, the temperature must in such cases be controlled to avoid undesirable vaporization of reactants and/or solvents, formation of undesirable by-products and the like. The reaction may if desired be carried out in the presence of an inert atmosphere and/or an inert diluent or solvent for the reactants. Solvents and diluents such as ethers, esters, excess condensing agent and the like may be employed. The usual ring-closing acidic condensing agents known in the art may be employed as for example glacial acetic acid, sulfuric acid, phosphoric acid, polyphosphoric acid, and the like. The duration of the reaction will be dependent on other factors such as temperature, concentrations, and the like, being usually completed in from about ½ to 10 hours. While approximately equimolar proportions of the reactants may be employed, it is preferred to have an excess of the quinone compound present. In general from about 1 to 3 moles of the quinone compound may be employed for each mole of 2-aminothiazole.

The reaction involving subjection of the condensation product described in the aforementioned copending application to ring-closure may be carried out in similar manner employing the usual ring-closing acidic condensing agents and reaction conditions.

As para-quinone compounds which may be employed in the process of the instant invention there may be mentioned p-benzoquinone, toluquinone, methoxyquinone, phenylquinone, paradiphenylquinone, p-naphthoquinone, 2-methyl-1,4-naphthoquinone and the like. The relatively unsubstituted p-quinones are, however, preferred such as p-benzoquinone and p-naphthoquinone.

As the 2-aminothiazole compound there may be mentioned 2-aminothiazole, 2-amino-4-methylthiazole, 2-amino-4-ethylthiazole, 2-amino-4-phenylthiazole, 2-amino-tetrahydrobenzothiazole, 2-aminobenzothiazole, 2-amino-6-methoxybenzothiazole, 2-amino-6-ethoxybenzothiazole, and the like.

In the formulae given above, R, $R_1$, $R_2$, $R_3$ and $R_4$ may represent H, methyl, ethyl, amyl, lauryl, methoxy, ethoxy, polyethoxy, phenyl, diphenyl, and the like. $R_2$ and $R_3$ may together represent a fused carbocycle as may R and $R_1$ forming a fused benzocycle or the like. The substituents may be different or all the same. Where R and $R_1$ and/or $R_2$ and $R_3$ represent the atoms necessary to form a cycle, the latter cycles may also be substituted by any of the aforementioned radicals. It will of course be understood that the quinone and 2-aminothiazole reactants, and the intermediate condensation products thereof, employed in the instant invention may contain additional inert substituents which do not interfere with the progress of the desired reaction or the properties of the products thereof.

In general, the products of this invention may be separated and/or purified by stripping off solvent, as by evaporation, dissolving the residue, which is soluble in both acid and alkali, in acid or alkali to get rid of the acid or alkali soluble impurities, clarifying and rendering the solution alkaline or acid to get rid of the alkali or acid soluble impurities, and then bringing the solution back to the neutral point to precipitate the desired product. Such products, being aromatic hydroxy compounds of the general type employed in the dyestuff art, are useful as coupling components for reaction with diazo components (diazotized primary aromatic amines) to produce azo pigments suitable for use in paints, varnishes, enamels and lacquers.

The following examples in which parts and proportions are by weight unless otherwise indicated are illustrative of the instant invention and are not be regarded as limitative.

Example 1

21.6 g. p-benzoquinone in 250 cc. glacial acetic acid at 40–45° C. was treated portionwise over a 30 minute period with 10 g. 2-aminothiazole. The rapidly darkening solution was warmed gently with agitation, but heating was discontinued as soon as the exothermic condensation started. After the vigor of the reaction had subsided, most of the solvent was removed by blowing with air, the temperature in the meantime being maintained at 90–100° C. The brown sludge was stirred into approximately 15 times its volume of water, filtered and the cake washed free of acetic acid. Extraction with 100 cc. hot 10% $H_3PO_4$ gave a dark brown solution which, on neutralization yielded a khaki to brown precipitate. Purification by selective removal of impurities from alkaline solution resulted in a light brown solid which is believed to be 6 (or 7)-hydroxythiazolo [3,2-a] benzimidazole of the formula:

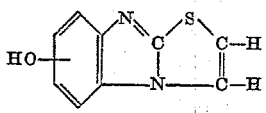

The product is soluble in caustic and most strong acids. It decomposes without melting above 150° C. Its neutral solution in organic solvents shows a very intense absorption peak at 2490 A.

Example 2

A product substantially identical to that of Example 1 is obtained by treating 2 g. 2-thiazolaminohydroquinone, prepared according to the process of Example 3 of the aforementioned copending application, of the formula:

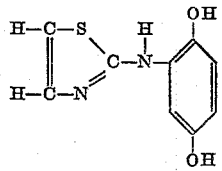

in 10 cc. glacial acetic acid with 1 g. polyphosphoric acid and stirring well at 95–100° C. for 20 minutes.

The product was then poured into 200 cc. water, clarified and brought to a pH of 11 or over with NaOH. Reclarification of the cooled solution and readjustment to a pH of 7.8–8.3 with mineral acid yielded the heterocyclic fused ring phenol.

Example 3

Replacement of the benzoquinone of Example 1 by 24.4 g. toluquinone gave the homologous thiozolo-imidazolocresol. Unlike the product of Example 1, this was shown by chromatography to consist of two major constituents, differing somewhat as to their physical and chemical properties, but having the same general characteristics. To these products separated by chromatographing on an alumina column were ascribed the isomeric formula:

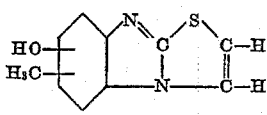

This formula covers isomeric products differing from each other due to bonding of the 2-amino N atom of the thiazole to the C atom of the quinone ring in para position to the OH and of the heterocyclic N atom of the thiazole in one of the positions ortho to said C atom, or to bonding of the said heterocyclic N atom to said C atom and of said 2-amino N atom in one of said positions ortho to said C atom.

Example 4

28 g. 1,4-naphthoquinone in 250 cc. glacial acetic acid at 45–50° C. were treated in small proportions through 30 minutes with 18 g. 2-amino-6-ethoxybenzothiazole. The darkening solution was refluxed four hours, and then evaporated to approximately 75 cc. and triturated with 500 cc. water overnight. 38 g. crude product was obtained. Separation by alkali and acid treatment as above gave a fair yield of a product which was ascribed by the formula

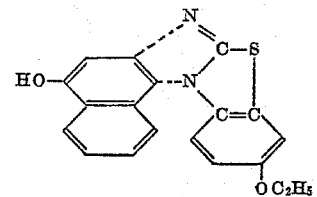

The dotted bonds in this formula are employed to indicate their interchangeability, i. e. to cover the isomeric compound wherein the 2-amino N atom of the thiazole is bonded to the naphthol radical in α-position and the heterocyclic N atom of the thiazole is bonded to the naphthol in β-position. The chromatographically homogeneous product is readily soluble in dilute NaOH, strong acid and common organic solvents. It has a characteristic fluorescence.

The following experiments were also carried out yielding analogous heterocyclic fused ring phenols having structural formulae of the products of this invention as set forth hereinbefore wherein R, $R_1$, $R_2$, $R_3$ and $R_4$ have values corresponding to and determined by the particular reactants employed:

| Ex. No. | Aminothiazole | Quinone |
| --- | --- | --- |
| 5 | 2-Aminothiazole | 2-Methyl-1,4-naphthoquinone. |
| 6 | 2-Amino-4-methylthiazole | p-Benzoquinone. |
| 7 | 2-Amino-4-phenylthiazole | Do. |
| 8 | 2-Aminotetrahydrobenzothiazole | Do. |
| 9 | ----do---- | Toluquinone. |
| 10 | 2-Aminobenzothiazole | p-Benzoquinone. |
| 11 | ----do---- | Toluquinone. |
| 12 | 2-Amino-6-methoxybenzothiazole | p-Benzoquinone. |
| 13 | 2-Aminothiazole | 1,4-Naphthoquinone. |

Example 14

3-nitro-p-anisidine is dispersed in water and diazotized in known manner. The resulting diazo solution is added to an alkaline solution containing a molecularly equivalent amount of the product of Example 1 above, and the coupling reaction allowed to continue to completion. The resulting azo pigment is filtered, washed and dried. The pigment is suitable for use in paints, varnishes, enamels and lacquers.

While this invention has been described with respect to certain preferred embodiments thereof, various modifications and variations thereof will become obvious to the person skilled in the art. It will be understood that such modifications and variations are to be included within the spirit and purview of this application and the scope of the appended claims.

I claim:
1. Compounds of the formula

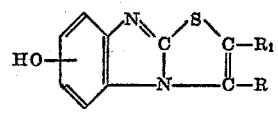

wherein $R_1$ and R are selected from the group consisting of H, lower alkyl, lower alkoxy, phenyl, and when taken together, the atoms necessary to form a 6-membered carbocycle.

2. A compound of the formula

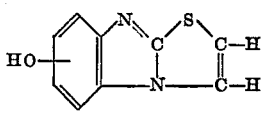

3. A compound of the formula

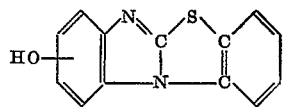

4. A compound of the formula

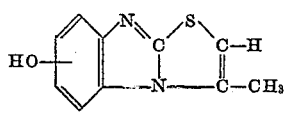

5. A compound of the formula

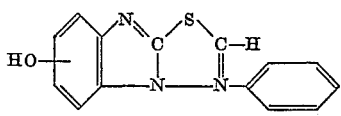

6. A compound of the formula

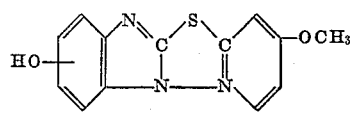

7. A process for producing a compound as defined in claim 1 comprising heating about 1 to 3 moles of p-benzoquinone with 1 mole of a compound of the formula

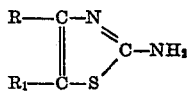

wherein $R_1$ and R are selected from the group consisting of H, lower alkyl, lower alkoxy, phenyl, and when taken together, the atoms necessary to form a 6-membered carbocycle, and ring-closing the resulting condensation product in the presence of a ring-closing acidic condensing agent at a temperature of about 50 to 120° C.

8. A process for producing a compound as defined in claim 1 comprising subjecting the 1–1 addition product of p-benzoquinone with a compound of the formula

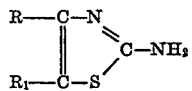

wherein $R_1$ and R are selected from the group consisting of H, lower alkyl, lower alkoxy, phenyl, and when taken together, the atoms necessary to form a 6-membered carbocycle, to a ring-closing reaction in the presence of a ring-closing acidic condensing agent at a temperature of about 50 to 120° C.

9. A process as defined in claim 8 wherein said acetic acid is glacial acetic acid.

10. A process for producing a compound as defined in claim 1 comprising ring-closing a compound of the formula

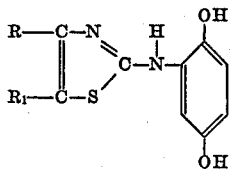

wherein $R_1$ and R are selected from the group consisting of H, lower alkyl, lower alkoxy, phenyl, and when taken together, the atoms necessary to form a 6-membered carbocyle, in the presence of a ring-closing acidic condensing agent at a temperature of about 50 to 120° C.

11. A process as defined in claim 10 wherein said condensing agent is glacial acetic acid admixed with polyphosphoric acid.

12. A process for producing a compound as defined in claim 2 comprising condensing 2-aminothiazole with p-benzoquinone and ring-closing the resulting condensation product in the presence of a ring-closing acidic condensing agent at a temperature of about 50 to 120° C.

13. A process for producing a compound as defined in claim 3 comprising condensing 2-aminobenzothiazole with p-benzoquinone and ring-closing the resulting condensation product in the presence of a ring-closing acidic condensing agent at a temperature of about 50 to 120° C.

14. A process for producing a compound as defined in claim 4 comprising condensing 2-amino-4-methyl thiazole with p-benzoquinone and ring-closing the resulting condensation product in the presence of a ring-closing acidic condensing agent at a temperature of about 50 to 120° C.

15. A process for producing a compound as defined in claim 5 comprising condensing 2-amino-4-phenyl thiazole with p-benzoquinone and ring-closing the resulting condensation product in the presence of a ring-closing acidic condensing agent at a temperature of about 50 to 120° C.

16. A process for producing a compound as defined in claim 6 comprising condensing 2-amino-6-methoxybenzothiazole with p-benzoquinone and ring-closing the resulting condensation product in the presence of a ring-closing acidic condensing agent at a temperature of about 50 to 120° C.

17. A process for producing a compound as defined in claim 2 comprising ring-closing the condensation product of 2-aminothiazole with p-benzoquinone in the presence of a ring-closing acidic condensing agent at a temperature of about 50 to 120° C.

References Cited in the file of this patent

Andersag: Chem. Abst., vol. 32, col. 2127 (1938).